Sept. 17, 1968 A. H. KELLER 3,401,508
COTTON HARVESTER WITH MEANS FOR AUTOMATICALLY
CLEANING TRASH SCREEN
Filed Aug. 2, 1965 2 Sheets-Sheet 1

Inventor:
Arthur H. Keller
John J. Kowalik
Atty.

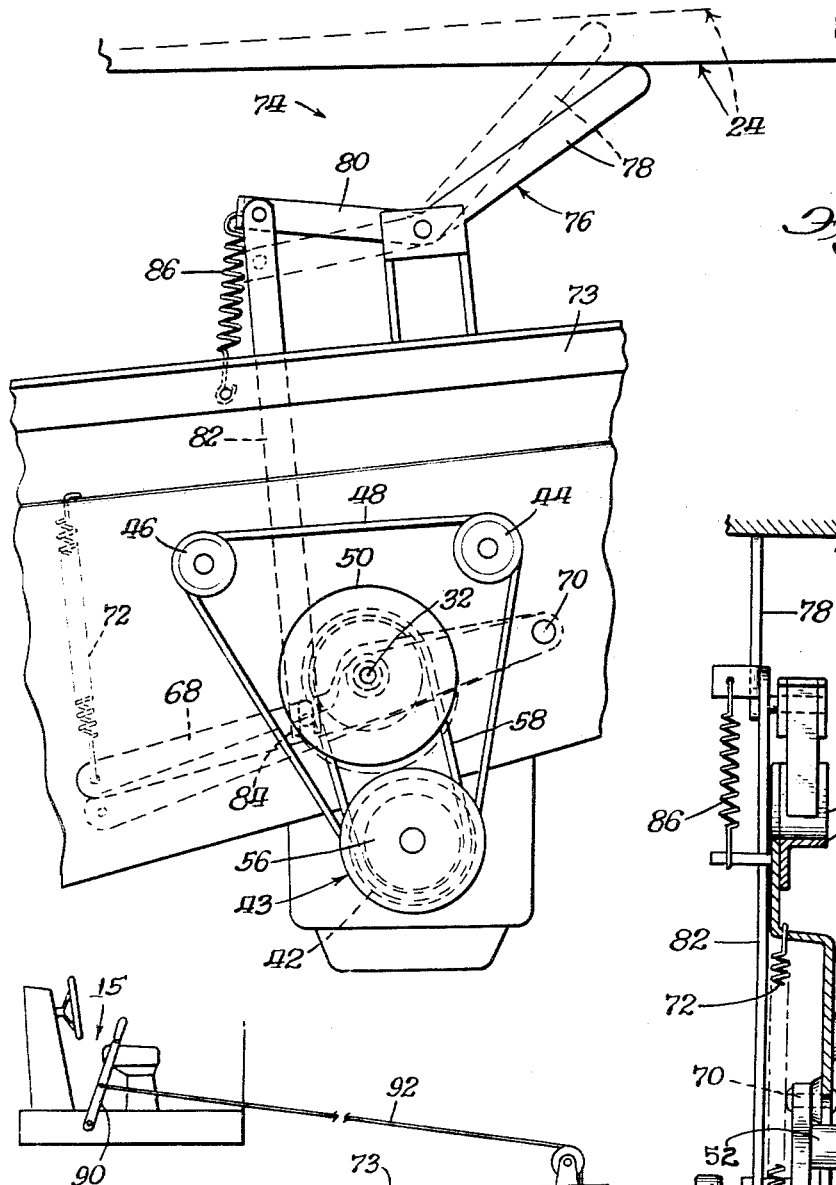
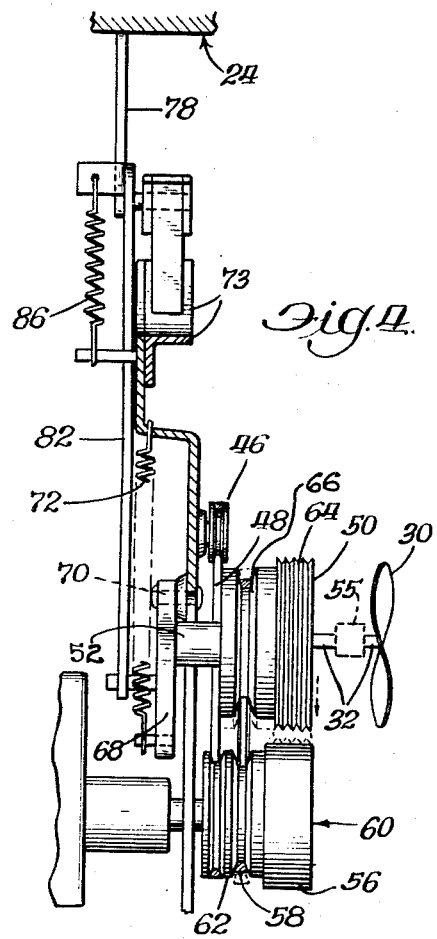
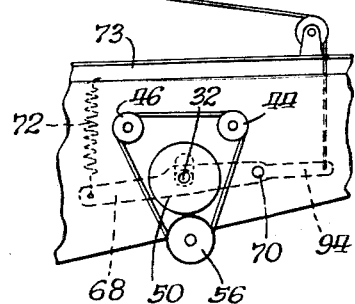

United States Patent Office 3,401,508
Patented Sept. 17, 1968

3,401,508
COTTON HARVESTER WITH MEANS FOR AUTOMATICALLY CLEANING TRASH SCREEN
Arthur H. Keller, Western Springs, Ill., assignor to International Harvester Company, Chicago, Ill., a corporation of Delaware
Filed Aug. 2, 1965, Ser. No. 476,258
5 Claims. (Cl. 56—11)

ABSTRACT OF THE DISCLOSURE

A cotton harvester having an engine with a heat transfer unit and a perforated dirt shield, a fan blowing air in one direction from the shield to the unit, a reversing drive for rotating the fan to reverse the direction of air flow, and a linkage operative between the cotton basket and the drive for reversing the fan when the basket is dumped and for accelerating the fan operation to reverse the air flow to clear the shield and a supplementary linkage for manual operation for reversing air flow at the option of the operator.

---

The present invention relates to a cotton harvester with means for automatically cleaning the trash screen thereof.

The engine in a self-propelled cotton harvester is provided with a cooling fan, and a screen to catch trash and foreign matter and prevent it from entering the engine radiator. The atmosphere surrounding a cotton harvester in operation is filled with trash, consisting of, lint, particles of leaves and stalks of the cotton plants, etc. After a certain period of operation, the trash accumulates on the screen and forms a heavy mat thereon, preventing the effective flow of cooling air therethrough and it becomes necessary to periodically clear this trash from the screen. The matter of so clearing the screen is always tedious and is frequently unattended since it required manual cleaning. As a consequence, the engine would operate at an excessively high temperature generally resulting in early engine failure.

A broad object of the invention is to provide novel mechanism for automatically dislodging such trash and foreign material from the trash screen of a cotton picker.

A more specific object is to provide means for reversing the cooling fan for the engine, thereby reversing the flow of air through the screen and blowing the trash therefrom.

Still another object is to provide means for the foregoing general character for so removing trash automatically in the normal operation of the harvester without any special attention or special act on the part of the operator for that purpose.

Another advantage of the invention relates to the fact that in the normal operation of a cotton harvester, the basket holding the picked cotton is periodically dumped, and in so dumping it, it is raised to a tilted position; it is another object of the invention to provide novel means of the foregoing general character which is automatically operated under the control of the basket in its dumping movements.

Other objects and advantages of the invention will appear from the following detail description taken in conjunction with the accompanying drawings in which—

FIGURE 3 is a detail view of the apparatus actuated by the basket for accomplishing the reversing of the engine fan;

FIGURE 4 is a view from the left of FIGURE 3; and

FIGURE 5 is a semi-diagrammatic view showing a supplemental form of manual control means.

Figure 1:
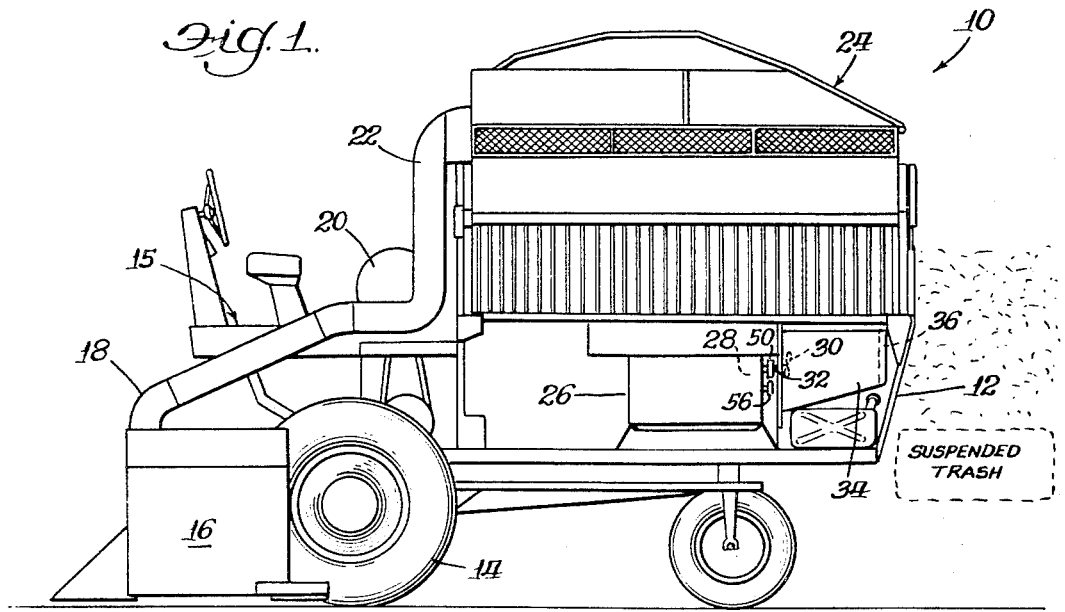
FIGURE 1 is a side elevational view of a cotton harvester embodying the features of the present invention, this view being semidiagrammatic, containing only the principal components of the harvester.
Figure 2:
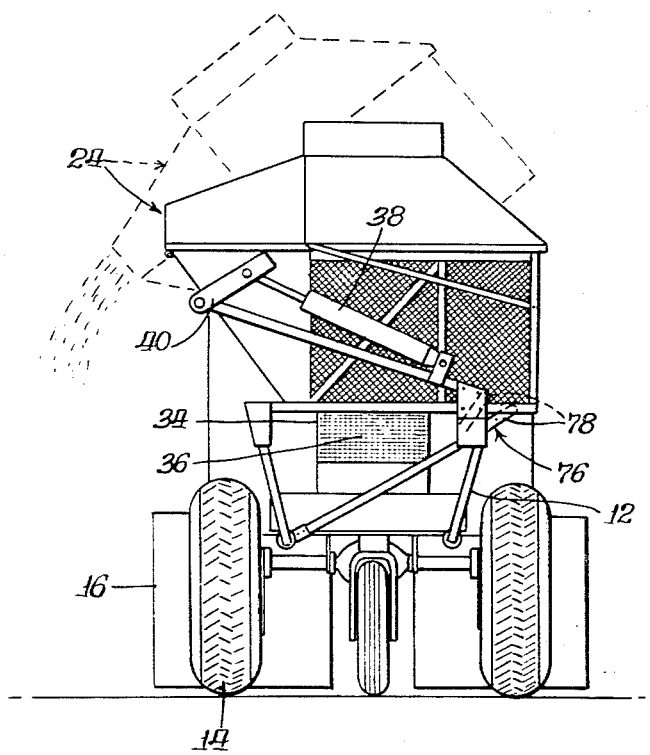
FIGURE 2 is a rear view of the harvester, taken from the right of FIGURE 1.

Referring now in detail to the drawings, attention is directed first to FIGURES 1 and 2 showing a cotton harvester in its entirety. These views are semi-diagrammatic in that they include only the principal components of the harvester to provide background for the application and operation of the apparatus of the invention. The harvester is designated 10 and includes a frame 12 mounted on suitable wheels 14 and includes an operator's platform 15 and a pair of row picker units 16. As the cotton is picked it is sucked through conduits 18 by a blower 20 and blown through other conduits 22 into a basket 24 mounted on the frame. The harvester is provided with a power plant including an engine 26 of any suitable kind having a radiator 28 and a cooling fan 30. The fan includes a shaft 32 mounted in suitable bearings for rotation in a manner described below. The fan is enclosed in a shield or hood 34 having a trash screen 36 at an inlet end. The fan on rotation thereof in a forward direction is operative for drawing air from the exterior through the screen 36 and through the hood 34 and then forcing it through the radiator 28 of the engine for cooling the engine. The hood 34 is of course closed, defining a continuous conduit from the screen to the engine.

The atmosphere surrounding a cotton harvester in the operation thereof is laden with trash such as lint, leaves and stalks of the cotton plant, sticks, etc. The screen 36 prevents the drawing of that trash therethrough and the trash accumulates on the screen to such an extent as to impair the cooling of the engine, and requires removal thereof. Heretofore removal of that trash has been a serious problem, requiring in many cases actual manual manipulation, such as by scraping and pulling it off. This required considerable time, seriously impairing the time efficiency of the machine. The present invention is designed to overcome that difficulty, and as stated above is controlled and operated by the tilting of the basket.

Specifically, means is provided for reversing the fan 30 so as to blow the air outwardly through the screen 36 to dislodge the trash from the outer side thereof. A suitable means for accomplishing this reversal is shown in FIGURES 3 and 4 where an engine belt drive pulley 42 is included in a pulley assembly 43 driven by the engine in the normal operation thereof. This pulley is utilized for driving various instrumentalities in the harvester including, for example, a water pump pulley 44, a generator pulley 46, etc., through a belt 48, as well as other moving components. In connection with the fan reversal feature of the present invention, a pulley 50 is provided for driving the fan, this pulley being mounted on a shaft 52 which is journalled in a suitable bearing as well known in the art. This pulley has suitable connection with the shaft 32 of the fan (FIGURE 1), which preferably includes universal joint connection indicated diagrammatically at 55. The details of such connection are not of the essence of the invention.

The pulley 50 is directly associated with a pulley 56 in the pulley assembly 43 and driven alternatively through a V-belt 58 and by direct friction contact engagement therewith.

Referring to FIGURE 4, the pulley 56 is of substantial width, i.e., in axial direction, and is provided with a high-friction peripheral surface 60 for frictional driving engagement with the pulley 50 as described below. It also includes a pulley element 62 having a V-groove receiving the belt 58.

The pulley 50 is also of substantial width in axial direction, and provided with high-friction peripheral surface 64 and in the present case includes circumferentially extending ribs. The material of the surface 64 is preferably resilient to provide good friction contact engagement with the pulley 56 when engaged therewith as referred to below. Included in the pulley 50 is a V-groove pulley element 66 to accommodate the belt 58.

The pulley 50 is mounted for movement toward and from the pulley 56, in the present instance generally vertically, and for this purpose is carried by an arm 68 pivoted at one end as indicated at 70 on a suitable element of the harvester frame. The pulley is positioned preferably at a short distance from the pivot axis of the arm to provide high mechanical advantage. Secured to the swinging end of the arm is a tension spring 72 having its other end secured to a suitable fixed frame element 73 and operative for biasing the pulley 50 away from the pulley 56, in this case upwardly, and establishing drive transmission engagement with the belt 58.

The pulley 50 is moved downwardly under the control of the basket 24 of the harvester through a linkage indicated generally at 74. This linkage includes a bell crank lever 76 pivoted on a suitable fixed element of the frame, having one arm 78 extending generally upwardly and positioned for engagement by the basket, and another arm 80 extending laterally. Pivotally connected to the extended end of the arm 80 is a link 82 extending downwardly where its lower end is connected with the arm 68 preferably through a lost motion connection 84 of suitable type. A tension spring 86 is connected between the swinging end of the lateral arm 80 and a fixed element of the frame.

In the picking operation of the harvester, when the basket 24 is in lowered position for receiving the cotton that has been picked, the basket engages the arm 78 and swings the bell crank lever 76 in clockwise direction which holds the link 82 in upper position. This permits the tension spring 72 to hold the arm 68 in raised position and the pulley elements 62 and 66 in drive transmission engagement with the belt 58 as stated above. In such position of the pulley 50, it is rotated in the same direction as the pulley 56 driven directly by the engine (in this case clockwise) and rotates the fan 30 in forward direction to draw air through the screen 36, the screen thus becoming filled and clogged with trash, as referred to above. When the load of cotton in the basket is dumped, the basket being tilted for this purpose and raised from the arm 78, the bell crank lever 76 is rotated counterclockwise under the action of the spring 86, this spring being substantially stronger than the spring 72 and overpowering the latter. Such rotation of the bell crank lever of course forces the link 82 downwardly which swings the arm 68 downwardly and carries the pulley 50 down into friction engagement with the pulley 56. The friction surfaces 60 and 64 of the pulleys being of substantial width and of high friction as stated above, assures effective drive transmission between the pulleys. In this case the pulley 50 rotates in the direction opposite that when driven through the belt (now rotating counterclockwise) and accordingly rotates the fan 30 in the opposite or reverse direction which is thereby operative for forcing the air outwardly through the screen 36, as well as reversing it through the radiator 28 of the engine. This reversing flow of the air clears the trash that has accumulated on the screen 36 and the radiator 28. After the load is dumped, the basket is lowered when it again engages the arm 78 of the bell crank lever and swings the latter in clockwise direction, whereupon the tension spring 72 is effective for raising the arm 68 and bringing the pulley elements 62 and 66 into driving engagement with the belt 58.

The throw of the pulley 50 need not be very great, only sufficient to clear it of any effect by the belt 58 in its lowered position. The grooves in the pulley elements 62 and 66 are of greater depth than the throw of the pulley 50 whereby to retain the belt in guiding engagement by the lower pulley element 62 when the pulley 50 is in lowered position, to prevent the belt from being dislodged from the pulley elements. In the present instance the throw of the pulley 50 may be on the order of ⅛ inch and the depth of the grooves ⅜ inch, for example, but other dimensions are of course permissible. These proportions are exaggerated in the illustration.

A great advantage of the invention resides in the fact that the reversing action of the fan is accomplished without any special attention or special action on the part of the operator, being performed automatically as an incident to the operation of dumping the basket, which operation must be performed periodically, generally at the ends of the rows. Another great advantage of the invention is that the reversing of the air flow is done while the harvester is otherwise idle, i.e., it is not moving or performing a picking operation. As a consequence, the engine in idling and without moving the harvester and performing the picking operation, runs faster and rotates the fan at a higher speed, for any given setting of the engine, and this produces a greater reverse air current than the forward air current, for clearing the screen. The idling speed of the power plant may be adjusted to any suitable level, for example greater than it would otherwise be set, for producing a high speed reverse air current.

The invention is not limited to a mechanism or linkage such as illustrated in FIGURES 3 and 4, but may include other kinds of control means. For example the mechanism could include an arrangement for positively swinging the bell crank lever 76 by the basket as the basket is tilted, as well as many other alternatives, the principal consideration being that the fan is automatically reversed and the air current produced thereby reversed, in response to the operation of dumping the load of cotton. It is also within the broad concept of the invention to provide for increased speed of the fan in reverse direction relative to its forward direction, for any given speed of the engine, by providing corresponding proportions or dimensions in the various drive transmitting elements.

It is possible to perform a reversing operation, by tilting the basket only a slight amount insufficient to dump the load. This may be desirable when turning around at row ends, for example, or even at any time.

It may be desired to clean the trash screen under manual control, notwithstanding the advantages of automatic cleaning. For example, the screen can be cleaned while the picker is not picking, and not dumping, by the device shown in FIGURE 5. In that device, a lever 90 is pivoted on the operator's platform, to which is connected a cable 92 of suitable kind leading to an extension 94 rigidly secured to the arm 68. Upon throwing the lever forwardly and drawing the cable, the arm is swung counterclockwise, overpowering the spring 72 and lowering the pulley 50, with the result described above. Thus the reversing operation can be performed without tilting the basket.

It is also possible to manually pull down the left-hand end (FIGURE 5) of the arm 68, as when the operator is standing beside the stationary picker.

While I have herein disclosed a preferred form of the invention it will be understood that changes may be made therein within the scope of the appended claims.

I claim:

1. In a cotton harvester having a prime mover including an engine with a heat transfer unit and fan means for inducing air movement through the unit and a perforate shield on the suction side of the unit for preventing trash from entering and clogging the unit, and a cotton harvesting mechanism and a receptacle transported on the prime mover wherein the receptacle is movable from cotton storing position to dump position, the improvement comprising means for reversing the fan action through the unit, link means connected between the receptacle and the reversing means and operative to reverse the action of the fan in consequence of movement of the receptacle from storing to dump position.

2. The invention according to claim 1 and said means for reversing the fan action including means for intensifying such reverse fan action concurrently with the harvester being stationary.

3. The invention set out in claim 1 wherein supplementary means is provided for reversing the fan action operable independently of movement of the receptacle and when the receptacle is in storing position.

4. In a cotton harvester having a prime mover, a cotton harvesting mechanism and a receptacle carried by the prime mover and adapted for receiving cotton picked by the harvester and means for moving the receptacle between a storing position and a dump position, the prime mover having a power unit including a heat transfer unit and means for producing an air stream to the heat transfer unit and a perforate shield for preventing the transmission of trash in the air stream to the heat exchange unit, the improvement comprising, drive transmission mechanism between the power unit and the means for producing the air stream having a normal position in which the means for producing the air stream is constantly operated in the normal operation of the harvester in direction for moving the air stream toward the heat exchange unit, means operatively associated with the receptacle and sensitive to the receptacle being in storing position for operating the drive transmission mechanism in said normal direction and responsive to the receptacle moving to dump position for reversing the direction of the drive transmission mechanism for correspondingly reversing the means for producing the air stream and thereby producing a clearing air stream in the opposite direction.

5. In a cotton harvester having a prime mover including an engine with a heat transfer unit and fan means for inducing air movement through the unit and a perforate shield on the suction side of the unit for preventing trash from entering and clogging the unit, and a cotton harvesting mechanism and a receptacle transported on the prime mover wherein the receptacle is movable from cotton storing position to dump position, the improvement comprising, means mounting the fan for operation in a forward acting condition and a reverse acting condition, yieldable biasing means for effecting the reverse acting condition of the fan, linking means operably associated with the receptacle and operable in response to the receptacle reposing in storing position for effecting the forward acting condition of the fan against the action of said biasing means, and manually actuable means operable for effecting the reverse acting condition of the fan independently of the foregoing means and while the receptacle is in storing position.

References Cited
UNITED STATES PATENTS

| | | | |
|---|---|---|---|
| 1,684,095 | 9/1928 | Heaton | 298—1 |
| 2,788,775 | 4/1957 | Steiner | 180—54 |
| 3,294,371 | 12/1966 | Hubbard | 298—1 |

ABRAHAM G. STONE, *Primary Examiner.*

J. W. PETERSON, *Assistant Examiner.*